(12) United States Patent
Klijsen et al.

(10) Patent No.: US 6,209,719 B1
(45) Date of Patent: Apr. 3, 2001

(54) STORAGE BOX AND SET-UP DEVICE FOR MASS INFORMATION CARRIERS

(75) Inventors: Hendrikus Lambertus Cornelis Klijsen, Delft; Frederik Willem Rombouts, Den Haag, both of (NL)

(73) Assignee: Xubapa V.O.F., Rotterdam (NL)

( * ) Notice: Subject to any disclaimer, the term of this patent is extended or adjusted under 35 U.S.C. 154(b) by 0 days.

(21) Appl. No.: 09/381,595

(22) PCT Filed: Mar. 23, 1998

(86) PCT No.: PCT/NL98/00163

§ 371 Date: Dec. 29, 1999

§ 102(e) Date: Dec. 29, 1999

(87) PCT Pub. No.: WO98/43247

PCT Pub. Date: Oct. 1, 1998

(30) Foreign Application Priority Data

Mar. 21, 1997 (NL) .................................................. 1005606

(51) Int. Cl.[7] .................................................. B65D 85/57
(52) U.S. Cl. .......................................... 206/308.1; 206/425
(58) Field of Search .................................. 206/308.1, 425, 206/309, 311, 312; 211/40, 41.12; 312/9.21, 9.22, 9.26, 9.47, 9.48

(56) References Cited

U.S. PATENT DOCUMENTS

| 5,027,950 | * | 7/1991 | Gutierrez et al. | 206/308.1 |
| 5,201,414 | * | 4/1993 | Kaszubinski | 206/309 |
| 6,000,541 | * | 12/1999 | Yu | 206/308.1 |

* cited by examiner

*Primary Examiner*—David T. Fidei
(74) *Attorney, Agent, or Firm*—Hoffmann & Baron, LLP (57) ABSTRACT

A storage box for mass information carriers such as CDs, computer disks, cassette tapes. The storage box includes a box part, at least one drawer part, a spring, and a lock. The box part has a drawer opening for slidably receiving the drawer part, which is arranged for receiving the mass information carrier. The spring is associated with the drawer part and is arranged for pressing the drawer part into an at least partially opened position. The lock associated with the drawer part is arranged for holding the drawer part in a closed position against the action of the spring. The box part, the drawer part, the spring and the lock are all manufactured in an injection molding process. A set-up device for a storage having a drawer part for receiving mass information carriers box is also provided. The set-up device has a base configured to clamp a number of storage boxes adjacent the lateral side thereof located opposite the drawer opening. The base is configured so that the clamped storage box is pivotable relative to the base.

15 Claims, 5 Drawing Sheets

STORAGE BOX AND SET-UP DEVICE FOR MASS INFORMATION CARRIERS

BACKGROUND OF THE INVENTION

The invention relates to a storage box for CDs, computer disks, cassette tapes and like mass information carriers, comprising a box part, at least one drawer part, and spring means and locking means associated with the or each drawer part, the or each drawer part being arranged for receiving the mass information carrier and being slidably receivable, via a drawer opening, in the box part, the spring means associated with the or each drawer part being arranged for pressing the relevant drawer part into an at least partially opened position, the locking means associated with the or each drawer part being arranged for holding the relevant drawer part in a closed position against the action of the spring means; the box part, the drawer part, the spring means and the locking means all being manufactured in an injection molding process, at least partly from synthetic material, the box part being manufactured from at least one molded part, the drawer part being manufactured from one molded part, the spring means and the locking means forming an integral part of one or more of the molded parts mentioned and hence being formed integrally with these molded parts during the injection molding process, the locking means forming an integral part of both the molded part comprising the drawer part and the at least one molded part comprising the box part.

Such storage box is known from international patent application WO 87/05884. On page 11, lines 27–32 of this publication, it is described that the spring 86 can be an integral part of the drawer part or the box part. Hence, from this publication, a skilled person may learn that the number of parts of which the storage box is manufactured, can be limited by designing the spring as an element formed integrally with the molded parts. The drawings of this publication directly make it clear that this also holds for the locking means.

A drawback of the known publication, however, is formed by the construction of the locking means. The drawer part of the known storage box can only be opened with one hand when a single storage box is taken in the hand. When a box located in a stack is to be opened, the left-hand side of the stack should be freely accessible for operating the locking means. In practice, however, usually more stacks of storage boxes are disposed side by side. Under those circumstances, the known storage box can only be opened when the storage box is removed from the stack. This is particularly inconvenient.

European patent application EP-A-0 568 729 discloses another storage box. The drawback of the construction known from that publication is that it consists of a large number of parts, to be manufactured separately. After the manufacture of these separate parts, the different parts of the storage box have to be assembled, which operation can be performed only manually. The manufacture of the large number of separate parts and the assembling operations have as a consequence that the cost price of the known box is too high, on which account it has not found widespread application in the market. Another drawback of the known box is that the unlocking means are operated by a separated unlocking button which occupies a considerable amount of space next to the drawer part. Not only does this disturb the outward appearance of the storage box, but the storage box is moreover considerably larger than the dimensions of the mass information carrier to be stored would require.

SUMMARY OF THE INVENTION

The object of the invention is to provide a storage box for mass information carriers of the type mentioned in the preamble, which storage box has the advantages of the known storage box, i.e. built up from few parts, and in which the drawbacks of the known storage box are overcome. The intended storage box must be capable of being manufactured in an economical manner and, moreover, must have an elegant outward appearance. The space occupied by the locking means must be minimal.

To this end, according to the invention, the storage box of the type mentioned in the preamble is characterized in that the locking means comprise at least one locking assembly, each locking assembly comprising a locking projection, an unlocking projection, a release projection, a spring lever, a first projection, a second projection and a retaining projection, the locking projection, the unlocking projection and the release projection forming a part of the at least one molded part comprising the box part, the first projection and the second projection being connected to a free end of the spring lever, which spring lever, together with the retaining projection, forms part of the molded part comprising the drawer part, the first projection being arranged for cooperating with the locking projection and the unlocking projection, the second projection being arranged for cooperating with the release projection and the retaining projection, in a closed position, the first projection being caught behind the locking projection, wherein for opening the drawer part the spring lever being pressed into an oblique position in that the first projection strikes the unlocking projection, the second projection thereby catching behind the retaining projection, enabling the first projection, in the slide open movement of the drawer part, to pass the locking projection, the second projection striking the release projection after the first projection has passed the locking projection, causing the second projection to be pressed from the retaining projection and allowing the spring lever to resume its original position.

Such storage box may have exactly the same dimensions as the conventional CD boxes, which are provided with a cover part which is pivotally connected to a bottom part. The locking means may be incorporated behind the drawer part, adjacent the sidewall located opposite the drawer opening. This enables the storage box according to the invention to be stored in the existing storage systems. Due to the construction of the locking means, entirely integrally formed with the molded parts from which the storage box is built up, the drawer can be opened by pressing the front side of the drawer. Hence, the opening and closing of the drawer part can be effected in a particularly simple manner. Even when the storage box is arranged in several stacks side by side, a storage box from the stack can be opened with one hand without the storage box having to be removed from the stack. Since the locking means are completely accommodated in the interior of the storage box, the storage box according to the invention moreover has an elegant outward appearance.

Preferably, the number of molded parts for the box part is kept to a minimum, i.e. one molded part. However, in view of the injection molds being withdrawable, it may be necessary that the box part be built up from two or more molded parts. In general, the drawer part can be assembled from one molded part. For the sake of the assembly of the storage box, the molded parts of the box part can readily be snapped together. The final assembly is effected by sliding the molded part comprising the drawer part into the drawer opening. After this final assembling operation, which can readily be automatized, the storage box is ready for use. Hence, the storage box according to the invention can be manufactured in a very inexpensive manner. The phrase 'at least partly' in the claim relates to embodiments wherein, in the injection molding process, a for instance metal spring is embedded in the plastic. This does not lead to additional assembling operations, because the metal parts form an integral part of the relevant molded part.

Further elaborations of the storage box according to the invention are described in the subclaims and will hereinafter be further explained on the basis of two exemplary embodiments, with reference to the accompanying drawings.

Because known set-up devices for mass information carriers are generally intended for boxes having a pivotable cover, the set-up devices therefor are of such design that the storage boxes have to be removed from the set-up device in order to be capable of being opened. As a result, the storage boxes keep lying around somewhere near the playback equipment and are not placed back in the set-up device. Another drawback of the known set-up devices is that the boxes are generally positioned in parallel relationship next to or above each other. As a consequence, only the text printed on the narrow lateral sides of the storage box is readable to the user. The text on the top and bottom sides of the storage box can only be read when the storage box is removed from the set-up device. International Publication number WO93/15978 discloses a set-up device for magnetic discs which are not each accommodated in a storage box. However, the principle of pivotably storing the mass information carriers provides the user with the possibility of leafing through the different mass information carriers without these mass information carriers having to be removed from the set-up device.

The object of the invention is to provide a set-up device for storage boxes without the above-described drawbacks.

To this end, the invention provides a set-up device comprising storage boxes according to the invention, which storage boxes each comprise a top and a bottom side and four lateral sides, while the thickness relative to the length and width of the top and bottom sides of the storage box is relatively slight, the set-up device further comprising a base disposable on a horizontal surface or connectable to an inclined or vertical surface, the base comprising means for clamping a number of storage boxes adjacent the lateral side thereof opposite the drawer opening, the means for clamping being so designed that a clamped storage box is pivotable relative to the base, with the imaginary pivot line of the pivotal movement extending parallel to and lying adjacent or coinciding with the lateral side located opposite the lateral side comprising the drawer opening.

Such set-up device provides the user the possibility of leafing through the different storage boxes without these boxes having to be removed from the set-up device. During this leafing operation, the user can read the text printed on the top and bottom sides of the respective storage boxes. Moreover, because the storage boxes comprise a drawer, the storage boxes need not necessarily be removed from the set-up device in order to take the mass information carrier from the storage box. Indeed, the storage box can be opened while it is still located in the set-up device. Hence, the set-up device according to the invention will no longer involve storage boxes being spread and getting mislaid.

Further elaborations of the set-up device according to the invention are described in the subclaims and will hereinafter be further explained on the basis of an exemplary embodiment, with reference to the accompanying drawings.

DETAILED DESCRIPTION OF THE PREFERRED EMBODIMENTS

Presently, with reference to FIGS. 1–3, two exemplary embodiments of a storage box for CDs, computer disks, cassette tapes and like mass information carriers will be described first. The storage box of FIG. 1 comprises a box part 1, 2, at least one drawer part 3, spring means 4 and locking means 5 associated with the drawer part 3. The or each drawer part 3 is arranged for receiving the mass information carrier and is slidably receivable in the box part 1, 2 via a drawer opening 13. The spring means 4 associated with the or each drawer part 3 are arranged for pressing the drawer part 3 into an at least partially opened position. The locking means 5 of the drawer part 3 are arranged for holding the relevant drawer part 3 in a closed position, against the action of the spring means 4. The box part 1, 2, the drawer part 3, the spring means 4 and the locking means 5 are all manufactured from plastic in an injection molding process. In the present exemplary embodiment, the box part 1, 2 is manufactured from two molded parts V1, V2. The drawer part 3 is manufactured from one molded part V3. The spring means 4 and the locking means 5 form an integral part of one or more of the molded parts V1, V2, V3 mentioned and are hence integrally formed with these molded parts V1, V2, V3 during the injection molding process. Although in the exemplary embodiment shown in FIG. 1, the box part 1, 2 is manufactured from two molded parts V1, V2, viz. a bottom part 1 and a cover part 2, it is also within the framework of the invention when the box part 1, 2 is manufactured from a single molded part. In view of the injection mold being withdrawable, two molded parts are opted for in the present case. According to the invention, a smallest possible number of parts should be aimed at so as to minimize the assembling operations.

The spring means 4 form an integral part of the molded part V3 comprising the drawer part 3. In the present exemplary embodiment, the spring means 4 are designed as a thin circular or elliptic strip of synthetic material connected to the rear side 14 of the molded part V3 comprising the drawer part 3. The elasticity of the plastic imparts a certain resilience to this strip, which resilience seeks to bring the strip 4 into its original shape. In the closed position of the drawer part 3, the plastic strip 4 does not have its original shape but is compressed, causing it to exert a spring force on the drawer part 3.

Figure 1:
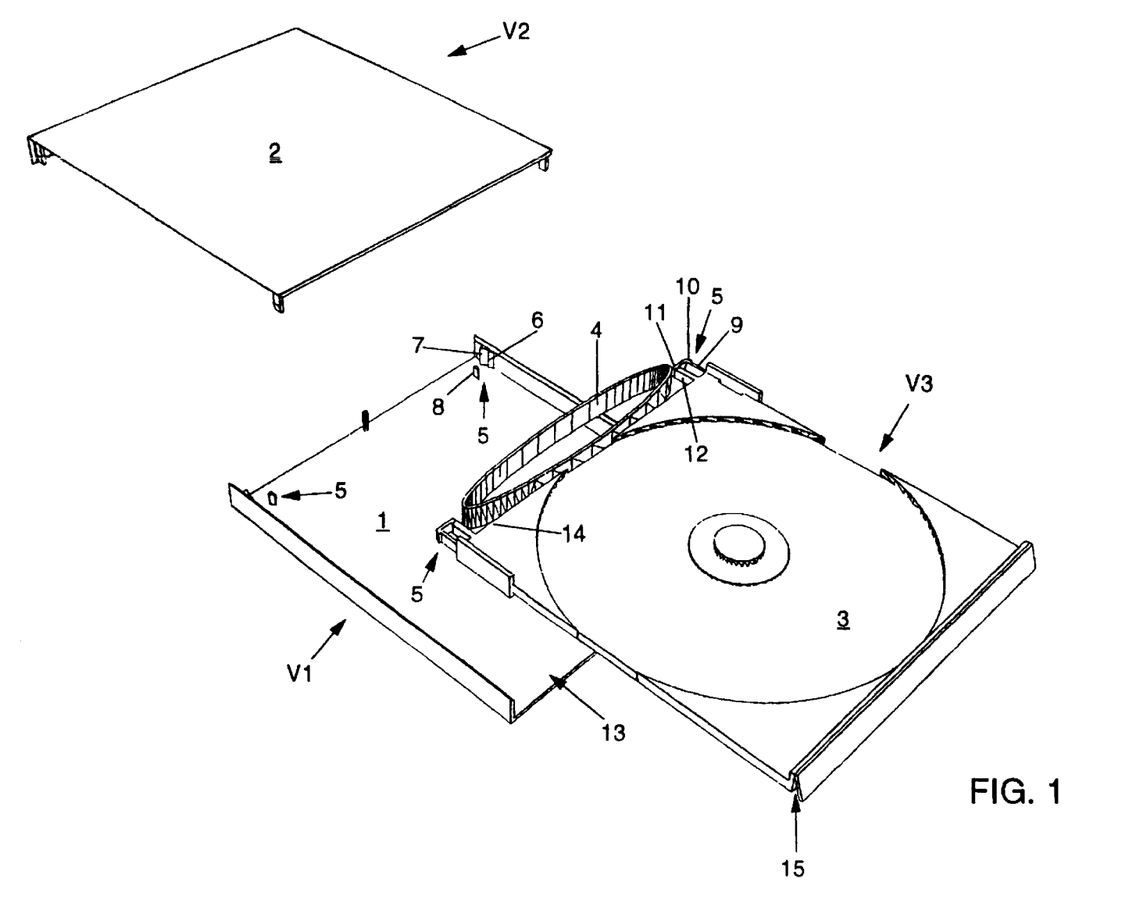
FIG. 1 is a perspective view with parts taken apart of a first exemplary embodiment of a storage box according to the invention.
Figure 2:
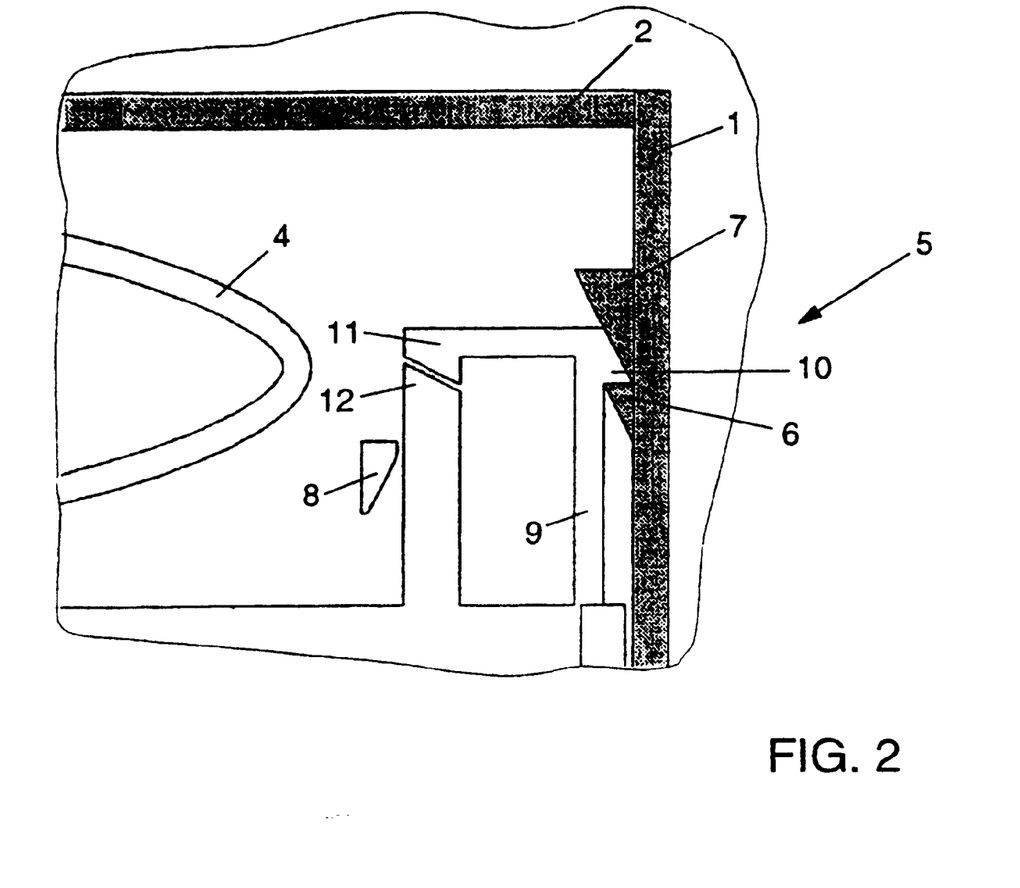
FIG. 2 is a top plan view of a locking assembly used in the exemplary embodiments of FIGS. 1 and 3.

As is clearly shown in FIGS. 1 and 2, the locking means 5 form an integral part of both the molded part V3 comprising the drawer part 3, and the at least one molded part V1, V2 comprising the box part 1, 2. The locking means 5 comprise at least one locking assembly 5. Each locking assembly 5 comprises a locking projection 6, an unlocking projection 7, a release projection 8, a spring lever 9, a first projection 10, a second projection 11 and a retaining projection 12. The locking projection 6, the unlocking projection 7 and the release projection 8 form part of the molded part V1 comprising the bottom part 1. The first projection 10 and the second projection 11 are connected to a free end of the spring lever 9, which spring lever 9, together with the retaining projection 12, forms part of the molded part V3 comprising the drawer part 3. The first projection 10 is arranged for cooperating with the locking projection 6 and the unlocking projection 7, and the second projection 11 is arranged for cooperating with the release projection 8 and the retaining projection 12. In the closed position, the first projection 10 is caught behind locking projection 6. When the drawer part 3 is to be opened, the user should press against the front side of the drawer part 3. This involves the spring lever 9 being pressed into an oblique position in that the first projection 10 strikes the unlocking projection 7. When the spring lever 9 is thus pressed leftwards, the second projection 11 catches behind the retaining projection 12, enabling the first projection 10, in the slide-open movement of the drawer part 3, to pass the locking projection 6. After the first projection 10 has passed the locking projection 6, the second projection 11 strikes the release projection 8, causing the second projection 11 to be pressed from the retaining projection 12 and allowing the spring lever 9 to resume its original position. Hence, when the drawer part 3 is closed, the first projection 10 can catch behind the locking projection 6 again for holding the drawer part 3 in its closed position. It will be understood that due to the complete absence of operating buttons for unlocking the drawer part 3, the storage box with locking means as described hereinabove has a particularly nicely lined outward appearance. Moreover, the control is simple and the operation is reliable.

The present exemplary embodiment of the storage box comprises two locking assemblies 5, each located adjacent an end of a lateral side 14 of the drawer part 3 opposite the drawer opening 13. This provides a stable locking of the drawer part 3. It is observed that in the exemplary embodiment shown, the projections 6, 7, 8, 10, 11 and the spring lever 9 are all located in a horizontal plane. It is understood that an arrangement of these parts in a vertical plane is also possible and also falls within the framework of this invention. Such arrangement may be advantageous in a storage box having a number of drawer parts 3, as shown in FIG. 3.

In the exemplary embodiment shown in FIG. 1, the molded part V3 comprising the drawer part 3 is also provided with an accommodation space 15 for accommodating documentation belonging to the mass information carrier, such as for instance an information booklet.

Figure 3:
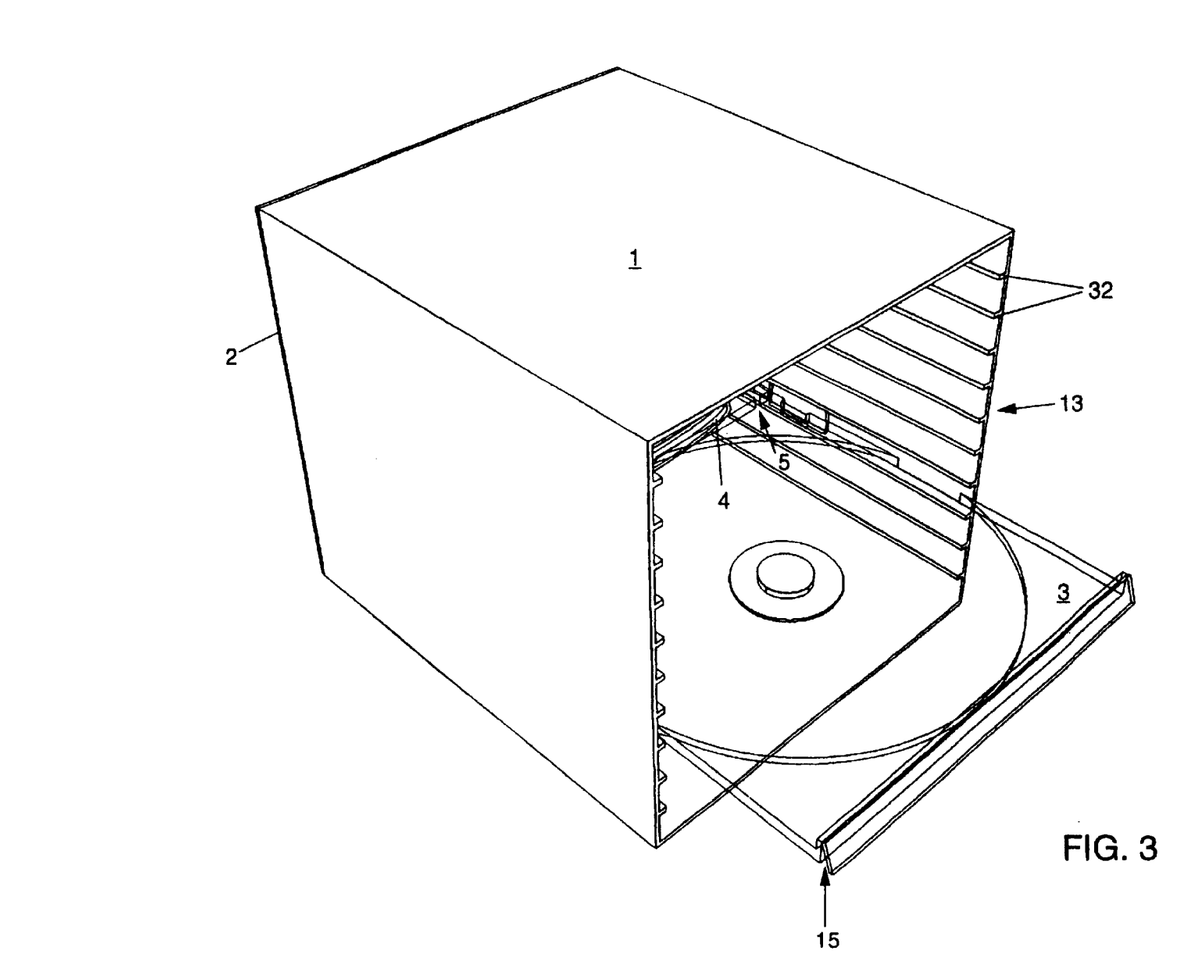
FIG. 3 is a second exemplary embodiment of a storage box according to the invention.

The exemplary embodiment shown in FIG. 3 differs from the exemplary embodiment shown in FIG. 1 only in that the storage box comprises a number of drawer parts 3. However, the locking means 5 and the spring means 4 are of similar design. The box part 1, 2 is likewise composed of two molded parts V1, V2, the first molded part V1 being a substantially tubular section 1 having drawer part guides 32 in the sidewalls thereof, and the second molded part V2 constituting a rear wall 2 of the storage box.

Figures 4, 5:
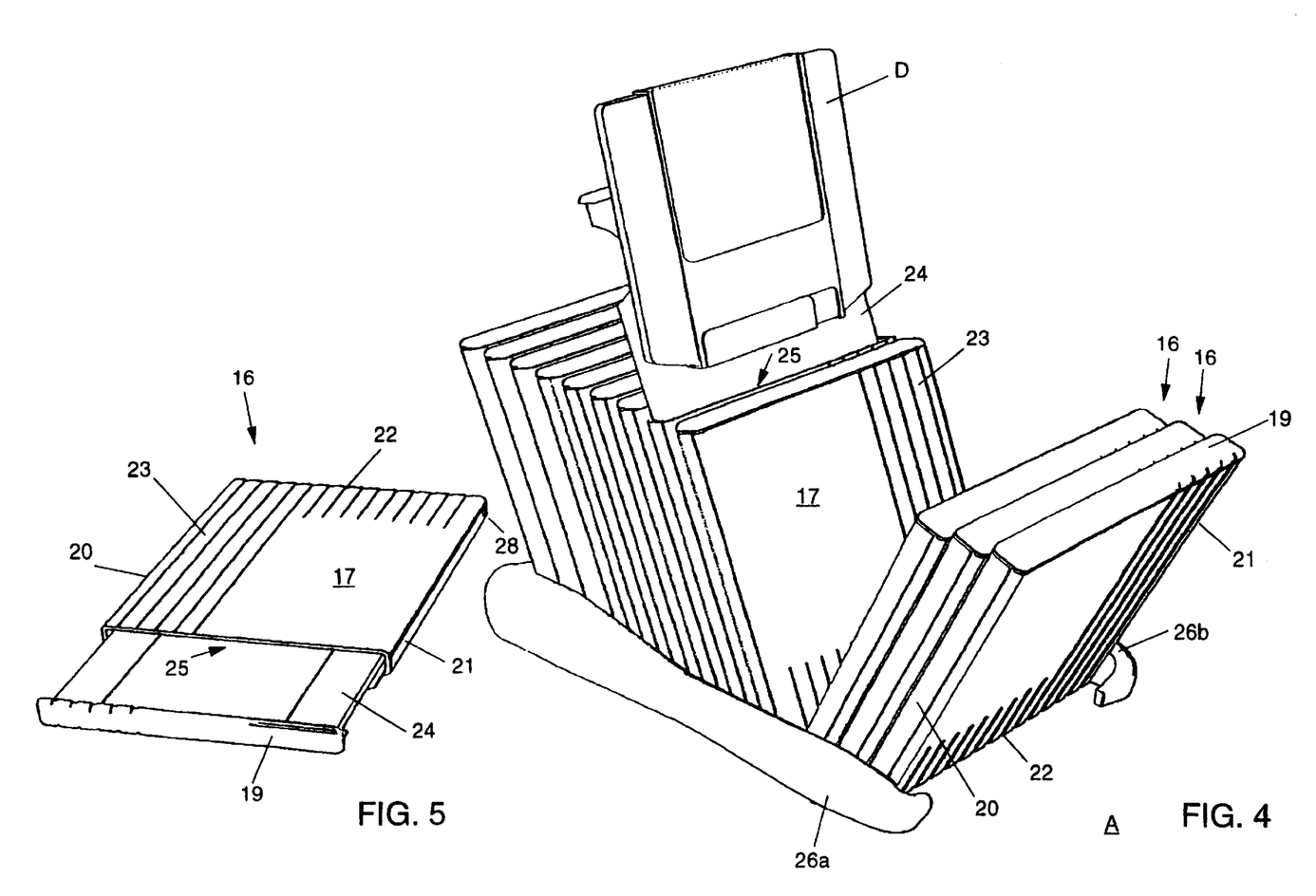
FIG. 4 is a perspective view of an exemplary embodiment of a set-up device for storage boxes for mass information carriers.
FIG. 5 is a perspective view of a storage box for a mass information carrier insertable into the set-up device shown in FIG. 4.
Figure 6:
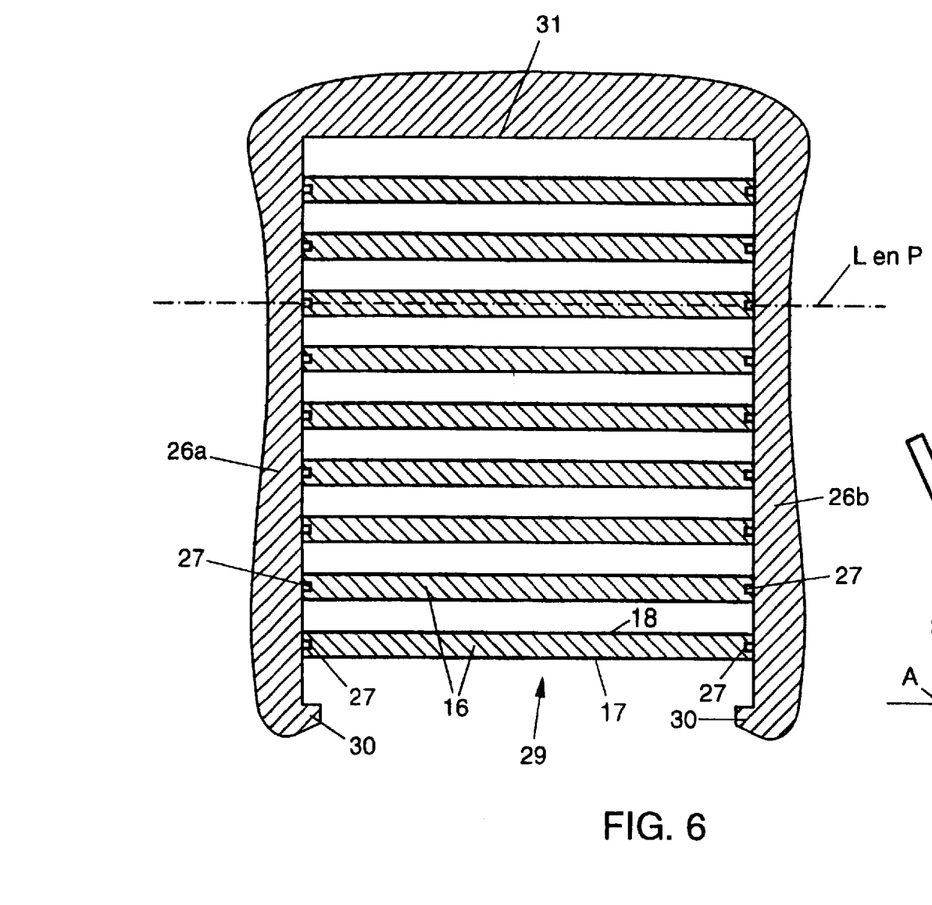
FIG. 6 is a sectional view through the base of the set-up device in a plane extending parallel to the face A on which the set-up device is set up or mounted.
Figure 7:
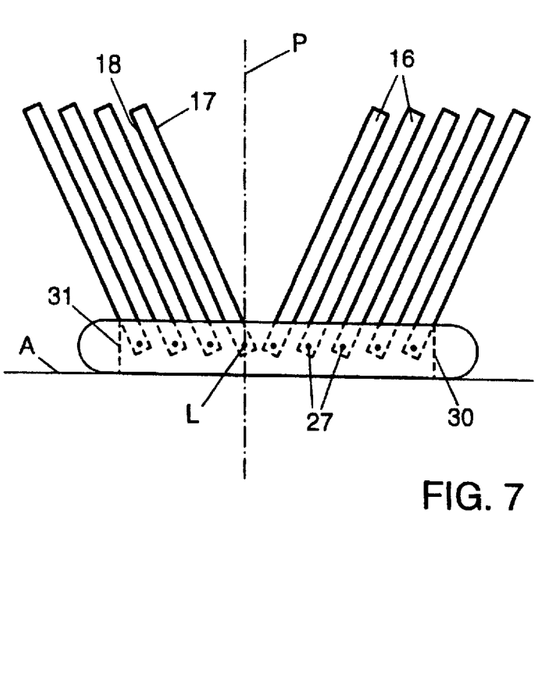
FIG. 7 is a side elevation of the set-up device shown in FIGS. 5 and 6.

FIGS. 4, 6 and 7 show an exemplary embodiment of a set-up device according to the invention. FIG. 5 shows an exemplary embodiment of a storage box 16 forming part of a set-up device according to the invention. The set-up device shown comprises storage boxes 16 according to the invention for storing CDs, computer disks, cassette tapes and like mass information carriers D. The storage boxes 16 have a top side and a bottom side 17 and 18 respectively, and four lateral sides 19, 20, 21, 22. The thickness of the storage box 16 relative to the length and width of the top and bottom sides 17, 18 of the storage box 16 is relatively slight. The storage boxes 16 each comprise a box part 23 and a drawer part 24 which, via a drawer opening 25 at one of the lateral sides 19 of the storage box 16, is slidably received in the box part 23. The set-up device comprises a base 26 disposable on a horizontal surface A or connectable to an inclined or vertical surface A. The base 26 comprises means 27 for clamping a number of storage boxes adjacent the lateral sides 22 thereof opposite the drawer openings 25. The means 27 for clamping are so designed that a clamped storage box 16 is pivotable relatively the base 26, while the imaginary pivot line L of the pivotal movement extends parallel to and lies adjacent or coincides with the lateral side 22 located opposite the lateral side 19 comprising the drawer opening 25. For this purpose, in the present exemplary embodiment, each storage box 16 is provided with two circular recesses 28, each located in a lateral side 20, 21 bounding the drawer opening 25, adjacent the lateral side 22 located opposite the drawer opening 25. The base 26 is provided with at least two opposite, parallel base parts 26a, 26b, between which a receiving cavity 29 is located, each base part 26a, 26b being provided, on a side facing the receiving cavity 29, with a series of pivot journals 27. Located opposite each pivot journal 27 on one base part 26a is a pivot journal 27 on the other base part 26b. Between each pair of opposite pivot journals 27, a storage box 16 can be clamped in that each pivot journal 27 of a pair of opposite pivot journals 27 can be brought into engagement with a circular recess 28, associated with that pivot journal 27, in the relevant storage box 16. In the shop, the mass information carriers will be presented in storage boxes 16 provided with recesses 28 and at home or at the company, they can be clamped or snapped in the base 26 of the set-up device. This prevents the storage box from becoming astray, while the main surfaces can nevertheless be properly inspected when the different storage boxes are being "leafed through".

To bound the pivotal movement of the storage boxes 16 in the set-up device, the base 26 of the present exemplary embodiment comprises at least two stops 30, 31. Thus, the pivotal movement of each storage box 16 is bounded between two inclined positions located on either side of an imaginary plane P associated with the relevant storage box, which plane P extends perpendicularly to the surface A on which the base 26 is disposed or to which the base 26 is connected, and in which imaginary plane P the imaginary pivot line L of the relevant storage box 16 is located. In these two extreme pivoting positions, the top and bottom sides 17, 18 respectively of the storage box 16 are perfectly readable.

It is understood that the invention is not limited to the exemplary embodiments described, but that various modifications are possible within the framework of the invention.

What is claimed is:

1. A storage box for mass information carriers, comprising a box part, at least one drawer part, the or each drawer part, being arranged for receiving the mass information carrier and being slidably receivable, via a drawer opening, in the box part, a spring means associated with the or each drawer part being arranged for pressing the relevant drawer part into an at least partially opened position, a locking means associated with the or each drawer part being arranged for holding the relevant drawer part in a closed position against the action of the spring means; the box part, the drawer part, the spring means and the locking means all being manufactured in an injection molding process, at least partly from synthetic material, the box part being manufactured from at least one molded part, the drawer part being manufactured from one molded part, the spring means and the locking means forming an integral part of one or more of said parts and hence being formed integrally with said molded parts during the injection molding process, the locking means forming an integral part of both the molded part comprising the drawer part and the at least one molded part comprising the box part characterized in that the locking means comprise at least one locking assembly, each locking assembly comprising a locking projection, an unlocking projection, a release projection, a spring lever, a first projection, a second projection, and a retaining projection, the locking projection, the unlocking projection and the release projection forming a part of the at least one molded part comprising the box part, the first projection and the second projection being connected to a free end of the spring lever, said spring lever together with the retaining projection forming part of the molded part comprising the drawer part, the first projection being arranged for cooperating with the locking projection and the unlocking projection, the second projection being arranged for cooperating with the release projection and the retaining projection, in a closed position, the first projection being caught behind the locking projection, wherein for opening the drawer part the spring lever being pressed into an oblique position in that the first projection, strikes the unlocking projection, the second projection thereby catching behind the retaining projection enabling the first projection, in the slide open movement of the drawer part to pass the locking projection, the second projection striking the release projection after the first projection has passed the locking projection causing the second projection to be pressed from the retaining projection and allowing the spring lever to resume its original position.

2. A storage box according to claim 1, wherein the locking means has two locking assemblies, the locking assemblies each being located adjacent an end of a lateral side of the drawer part opposite the drawer opening.

3. A storage box according to claim 1, wherein the molded part comprising the drawer part is also provided with an accommodation space for accommodating documentation relating to the mass information carrier.

4. A storage box according to claim 1, wherein the box part is manufactured from two molded parts, the molded parts being a bottom part and a cover part.

5. A storage box according to claim 4, wherein the locking means has two locking assemblies, the locking assemblies each being located adjacent an end of a lateral side of the drawer part opposite the drawer opening.

6. A storage box according to claim 4, wherein the molded part comprising the drawer part is also provided with an accommodation space for accommodating documentation relating to the mass information carrier.

7. A storage box according to claim 1, wherein the spring means form an integral part of the molded part comprising the drawer part.

8. A storage box according to claim 7, wherein the locking means has two locking assemblies, the locking assemblies each being located adjacent an end of a lateral side of the drawer part opposite the drawer opening.

9. A storage box according to claim 7, wherein the molded part comprising the drawer part is also provided with an accommodation space for accommodating documentation relating to the mass information carrier.

10. A set-up device comprising:
a plurality of storage boxes for storing mass information carriers, said storage boxes each comprising a top and a bottom side and four lateral sides, the thickness relative to the length and width of the top and bottom sides of the storage box being relatively slight, said storage boxes each comprising a box part and a drawer part which, via a drawer opening at the location of one of the lateral sides of the storage box, is slidably accommodated in the box part; and
a base for positioning on a surface comprising means for clamping a number of storage boxes adjacent the lateral side thereof located opposite the drawer opening, the means, for clamping being so designed that a clamped storage box is pivotable relative to the base about an imaginary pivot line, the imaginary pivot line of the pivotal movement extending parallel to and lying adjacent with the lateral side located opposite the lateral side comprising the drawer opening.

11. A set-up device according to claim 10, wherein each storage box is provided with two circular recesses, each located in a lateral side bounding the drawer opening, adjacent the lateral side located opposite the drawer opening, the base being provided with at least two opposite, parallel base parts, whereinbetween a receiving cavity is located, each base part being provided, on a side facing the receiving cavity, with a series of pivot journals, while opposite each pivot journal on one base part, a pivot journal is located on the other base part, and between each pair of opposite pivot journals, a storage box can be clamped in that each pivot journal of a pair of opposite pivot journals can be brought into engagement with a circular recess, associated with said pivot journal, in the relevant storage box.

12. A set-up device according to claim 11, wherein the base comprises at least two stops whereby the pivotal movement of the storage boxes is bounded between two inclined positions located on either side of an imaginary plane, which plane extends perpendicularly to the surface on which the base is disposed or to which the base is connected, and in which imaginary plane the imaginary pivot line of relevant storage box is located.

13. A set-up device comprising:
a plurality of storage boxes for storing mass information carriers, said storage boxes each comprising a box part, at least one drawer part, the or each drawer part, being arranged for receiving the mass information carrier and being slidably receivable, via a drawer opening, in the box part, a spring means associated with the or each drawer part being arranged for pressing the relevant drawer part into an at least partially opened position, a locking means associated with the or each drawer part being arranged for holding the relevant drawer part in a closed position against the action of the spring means; the box part, the drawer part, the spring means and the locking means all being manufactured in an injection molding process, at least partly from synthetic material, the box part being manufactured from at least one molded part, the drawer part being manufactured from one molded part, the spring means and the locking means forming an integral part of one or more of said parts and hence being formed integrally with said molded parts during the injection molding process, the locking means forming an integral part of both the molded part comprising the drawer part and the at least one molded part comprising the box part characterized in that the locking means comprise at least one locking assembly, each locking assembly comprising a locking projection, an unlocking projection, a release projection, a spring lever, a first projection, a second projection, and a retaining projection, the locking projection, the unlocking projection and the release projection forming a part of the at least one molded part comprising the box part, the first projection and the second projection being connected to a free end of the spring lever, said spring lever together with the retaining projection forming part of the molded part comprising the drawer part, the first projection being arranged for cooperating with the locking projection and the unlocking projection, the second projection being arranged for cooperating with the release projection and the retaining projection, in a closed position, the first projection being caught behind the locking projection, wherein for opening the drawer part the spring lever being pressed into an oblique position in that the first projection, strikes the unlocking projection, the second projection thereby catching behind the retaining projection enabling the first projection, in the slide open movement of the drawer part to pass the locking projection, the second projection striking the release projection after the first projection has passed the locking projection causing the second projection to be pressed from the retaining projection and allowing the spring lever to resume its original position; and a base for positioning on a surface comprising means for clamping a number of storage boxes adjacent the lateral side thereof located opposite the drawer opening, the means, for clamping being so designed that a clamped storage box is pivotable relative to the base about an imaginary pivot line, the imaginary pivot line of the pivotal movement extending parallel to and lying adjacent with the lateral side located opposite the lateral side comprising the drawer opening.

14. A set-up device according to claim 13, wherein each storage box is provided with two circular recesses, each located in a lateral side bounding the drawer opening, adjacent the lateral side located opposite the drawer opening, the base being provided with at least two opposite, parallel base parts, whereinbetween a receiving cavity is located, each base part being provided, on a side facing the receiving cavity, with a series of pivot journals, while opposite each pivot journal on one base part, a pivot journal is located on the other base part, and between each pair of opposite pivot journals, a storage box can be clamped in that each pivot journal of a pair of opposite pivot journals can be brought into engagement with a circular recess, associated with said pivot journal, in the relevant storage box.

15. A set-up device according to claim 14, wherein the base comprises at least two stops whereby the pivotal movement of the storage boxes is bounded between two inclined positions located on either side of an imaginary plane, which plane extends perpendicularly to the surface on which the base is disposed or to which the base is connected, and in which imaginary plane the imaginary pivot line of relevant storage box is located.

* * * * *